United States Patent [19]

Neumann

[11] 4,079,008
[45] Mar. 14, 1978

[54] MIXING APPARATUS FOR BIOCHEMICAL TREATMENT OF FLUIDS WITH OXYGEN

[75] Inventor: Boris Neumann, Monza, Italy

[73] Assignee: Worthington Pump, Inc., Mountainside, N.J.

[21] Appl. No.: 744,963

[22] Filed: Nov. 26, 1976

[30] Foreign Application Priority Data

Jul. 7, 1976 Italy .................................. 25091/76

[51] Int. Cl.$^2$ .............................................. C02C 1/08
[52] U.S. Cl. .................................. 210/194; 210/220; 261/123; 261/124
[58] Field of Search ........... 210/221 P, 221 M, 221 R, 210/220, 198 R, 14, 44, 60, 194; 209/168, 170; 261/124, 123, DIG. 75

[56] References Cited

U.S. PATENT DOCUMENTS

| | | | |
|---|---|---|---|
| 2,047,989 | 7/1936 | Woelflin | 210/44 |
| 3,446,488 | 5/1969 | Mail et al. | 210/44 |
| 3,642,618 | 2/1972 | Silva | 210/44 |
| 3,645,892 | 2/1972 | Schulman | 210/221 P |
| 3,772,187 | 11/1973 | Othmer | 210/60 |
| 3,870,635 | 3/1975 | Clarke-Pounder | 210/221 P |

Primary Examiner—Charles N. Hart
Assistant Examiner—Benoit Castel
Attorney, Agent, or Firm—Daniel H. Bobis

[57] ABSTRACT

A mixing vessel is provided for the treatment of wastes with aerobic bacterial cultures having high-turbulent mixing under conditions supportive of rapid waste digestion. The mixing vessel has a chamber therein with a sparger depending into the central portion and providing streams of incoming untreated waste feed that are distributed radially from the longitudinal axis of the vessel. Medially positioned in the chamber is an annular collector concentric to the sparger for withdrawing waste material under treatment into a recirculation loop. The collector is operatively associated with a recirculation pump, a system outlet, an aeration fluid delivery means and a jet injector. The jet injector has a nozzle for propelling at high velocities a jet of fluids upwardly into the chamber along the longitudinal axis. The jet is comprised of recirculation wastes and entrained air. Associated with the nozzle is a deflector plate which serves to deflect and break the jet into a multiplicity of mixing currents causing each current to flow from the deflector plate radially (or outwardly) toward the base or lower portion of the sidewall of the chamber, thence diverted along such sidewall, thence diverted by the top of the chamber radially (inwardly) to the portion of the chamber surrounding the longitudinal axis and downwardly therealong.

Rapid digestion may be achieved as aerobic bacterial culture contact with the waste under treatment is enhanced by the turbulent flow conditions and aeration fluid flow to support bacterial growth may be optimized.

The mixing vessel may be adapted for batch or continuous processing by suitable flow controls for waste feed, system outlet, recirculation rate, and aeration fluid metering.

5 Claims, 7 Drawing Figures

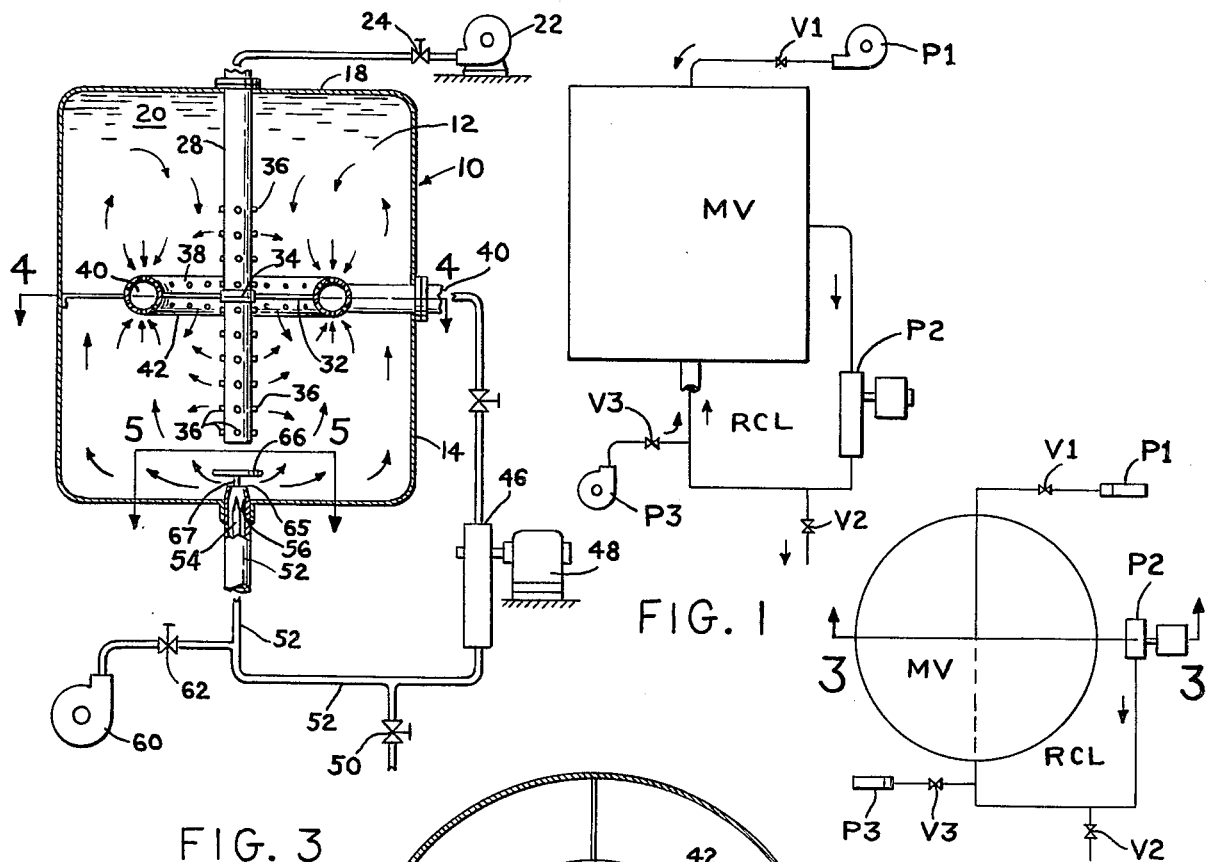
FIG. 1
FIG. 2
FIG. 3
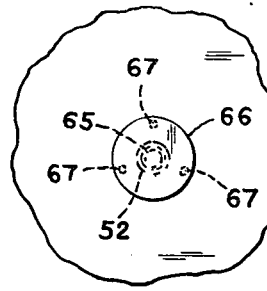
FIG. 5
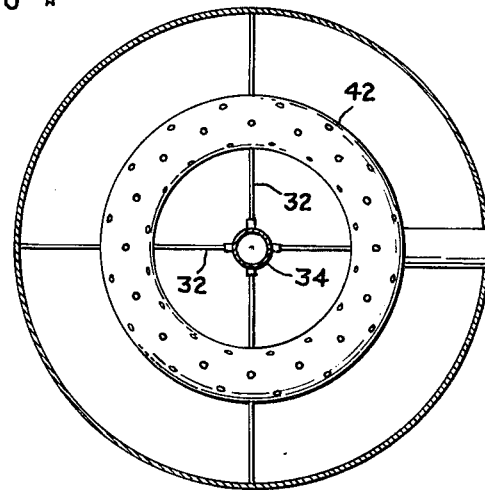
FIG. 4
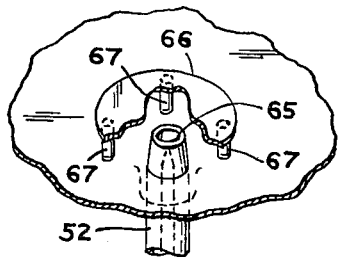
FIG. 6
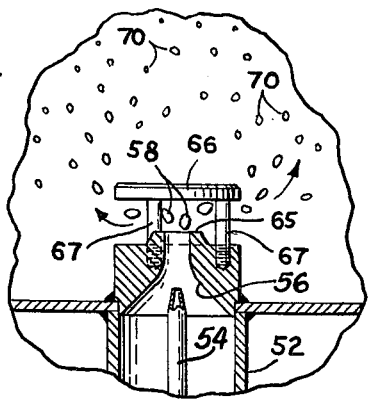
FIG. 7

MIXING APPARATUS FOR BIOCHEMICAL TREATMENT OF FLUIDS WITH OXYGEN

BACKGROUND OF THE INVENTION

This invention relates to a mixing vessel for biochemical treatment of substances with cultures of bacteria, and more particularly to processes such as treatment of wastes, sewage digestion, purification of water and fermentation. The invention relates more particularly to a closed mixing system operable either in a batch or a continuous mode in which turbulent action is induced by injection of partially treated, recirculated waste material and of fluid additives supportive of bacterial-culture growth.

In the past and today in many existing waste treatment plants digestion by aerobic bacteria was and is conducted in large installations in a series of massive holding tanks each having long dwell times and various mixing and aeration devices associated therewith. More recently Venturi aerators have been utilized such as those shown in U.S. Pat. Nos. 3,271,304; 3,334,868 and 3,497,164.

In such prior art apparatuses the arrangement shown do not have the intimate mixing of partially treated waste with aeration fluid prior to and upon injection of the recirculation wastes. The recirculation of the present invention provides active digester operation during required time for digestion and reduces overall time for obtaining effluent purity desired.

SUMMARY OF THE INVENTION

Thus the present invention covers a closed digester or mixing vessel into which sewage or waste slurries are introduced through a feed pump that maintains the total volumetric content of the system. The feed is induced through a centrally disposed inflow pipe which is closed at lowermost end, but includes a series of orifices distributed over the length of the pipe so as to break the inflowing fluid into a plurality of smaller radially emitted streams. After filling the vessel to be within the efficient operational range and until sufficient bacterial digestion has been initiated, the digester contents are recirculated with air-or an oxygen-containing fluid combined therewith to support a high-rate growth of bacteria.

The recirculation is effected by withdrawing the waste under treatment through an annular, perforated collector concentric the inflow pipe. The outlet of the annular collector is connected to the suction of a second pump or recirculation pump. Into the recirculated fluid, a third pump or aeration pump injects air or any other bacterial-growth supporting fluid. The combined mixture of recirculated fluid and air is injected into the mixing vessel through an injection nozzle that directs the inflow against a baffle. The baffle performs a two-fold function of directing the mixture towards the inner walls of the vessel resulting in high turbulence and breaking the jet flow into a multiplicity of streamlines. The significance of the latter action is to increase the surface area of gas thereby increasing the surface contact area between the air and the bacteria with a resultant increase in the bacterial growth rate.

As digestion occurs, the treated waste is monitored at a point downstream from the recirculation pump outlet and, upon reaching an acceptable level for discharge, a portion of the treated waste is diverted therefrom to the system discharge outlet. The material discharged is replaced by an equivalent volume of feed at the initial system inlet.

Accordingly it is an object of the present invention to provide an improved mixing apparatus for biochemical treatment of waste fluids with oxygen.

It is another object of the present invention to provide a high turbulence mixer by use of jet injection of recirculated waste.

It is a feature of the present invention to utilize a deflector plate in the recirculation system for producing a multiplicity of streamlines to achieve increased surface contact between the materials under treatment and additive fluids.

It is yet another object of the present invention to inject a gaseous fluid into the recirculating waste so as to accelerate bacterial growth and to hasten digestion of waste.

It is yet another object of this invention to reduce time for chemical or biochemical processes as reaction time in such chemical or biochemical processes are directly proportional to the surface of contact of the reagents.

It is a feature of the present invention to utilize a sparger disposed on the longitudinal axis of the mixing vessel for feed introduction and in association therewith an annular collector concentric to the sparger.

It is yet another feature of the present invention that the pattern of flow generated, flow intensity and the level of turbulence are predictable and are easily controllable.

It is another feature of the present invention to provide an improved biochemical treatment mixing vessel which is readily used in batch or continuous modes of operation.

Other objects and advantages of the invention will be apparent from the following detailed description taken in connection with the accompanying drawings in which:

FIG. 1 is a side view of a mixing system having an improved mixer-digester tank in accordance with the present invention.

FIG. 2 is a top view of the mixing system shown in FIG. 1.

FIG. 3 is a vertical section through the mixer-digester tank taken on line 3—3 of FIG. 2.

FIG. 4 is a cross-section taken on line 4—4 of FIG. 3.

FIG. 5 is a fragmentary inside plan view of the jet inlet device taken on line 5—5 of FIG. 3.

FIG. 6 is an enlarge perspective view of the jet inlet device as shown in FIG. 5 partly broken away.

FIG. 7 is a more detailed cross-section of the jet inlet device of FIG. 3.

DESCRIPTION OF THE PREFERRED EMBODIMENT

Referring now to FIGS. 1 and 2 schematic representations of the mixing vessel for the biochemical treatment of sewage together with associated fluid flow control elements. The mixing vessel MV of the preferred embodiment has associated therewith a primary and a secondary inlet control means. The primary inlet control means, valve V1 and pump P1, provides feed of untreated sewage. The secondary inlet control means provides for recirculation (through recirculation control loop RCL) of partially treated sewage and injection therein of digestion-supportive additives. The recirculation control loop RCL is provided with pump P2 for withdrawing partially treated sewage, system outlet valve V2 (normally closed during batch operation), pump P3 for adding to recirculated material digestion-supportive additives such as air or other oxygen containing fluids, and valve V3 for controlling direction of flow from pump P3.

The structure of the mixing vessel (MV), generally designated as 10, is shown in detail in FIGS. 2 through 7. The interior of the mixing vessel forms a closed, aerobic waste-treatment chamber 12 having a generally circular side wall 14 with a substantially flat bottom 16 and top 18. Waste feed material 20, such as raw sewage or industrial waste, is introduced into the mixing vessel until such vessel is substantially filled preferably completely filled or slightly pressurized. The influence of feed 30, as shown in the preferred embodiment, is provided by passage through sewage pump (P1) 22 under the control of valve (V1) 24 and passage through feed line 28 to sparger (or distributor) 28. The sparger 28 is a closed end cylinder that depends from the central portion of top 18 almost the entire length of longitudinal axis of mixing vessel 10. The sparger is stabilized by supporting struts 32 and collar 34 at a point medial said top 18 and bottom 16. Proximal to the collar 34 and on either side thereof, a plurality of orifices 36 is located throughout the central portion of the chamber for providing discharge outlet means. Located concentric to sparger 28 and also supported by struts 32 is an annular or toroidal collector 28 disposed so that the plane in which lies the circular centerline 40 thereof is substantially normal to longitudinal axis 30.

Referring particularly to FIG. 4, the concentric relationship between sparger 38 and collector 38 is clearly shown. The effluence of partially treated waste for either recirculation or system discharge is obtained through uniformly distributed collector perforations 42 and is urged through discharge outlet line 44 by connection to the suction side of recirculation pump (P2) 46 which is in turn driven by pump motor 48.

For continuous operation, the mixing vessel is equipped with system discharge valve (V2) 50. To maintain efficient continuous operations, the system may be equipped with volumetric control means (not shown) for the purpose of metering the rate of production—the system output through valve 50—and for ensuring an equivalent inlet or make-up rate through valve 24.

The discharge or recirculation line 52 is arranged for cooperative functioning with an injection nozzle 54 to deliver recirculation and additive fluids as described in the discussion of the schematic diagram above. In the preferred embodiment, the injection nozzle connects to centrally located inlet 56 of mixing vessel bottom 16. Depending upon the nature of the waste under treatment, the degree of treatment already received by the waste, and the oxygen utilization of the aerobic bacterial culture, the recirculated fluid is joined at the injection nozzle 54 by a supply of digestion-supportive additive 58, usually, but not limited to a fluid such as air. The additive fluid 58 is entrained in the recirculated medium and is metered thereto by supply pump (P3) 60 under the control influence of relief/check valve (V3) 62. In batch operation, the additive supply means structure may be adapted to be at high volume levels at initial stages of digestion and at low volume levels at final stages thereof, and by contrast, in the continuous operation, the structure may be simplified for constant addition of air based on exponential factors. The jet injector or injection nozzle 54 is disposed in an upwardly discharging position, as illustrated in FIG. 6, and is arranged to discharge recirculation and additive fluids in a direction substantially tangential to inlet of fluids from sparger 28. The jet nozzle 54 of this invention is designed to accelerate fluid flow from pipeline 52. Rapid acceleration which is subsequently followed by a deceleration outside of the nozzle, both associated with high degree of internal shear, produce strong breaking up effect. The sizing and form of the nozzle is related to pump characteristics, to the size of the vessel, to the nature of the liquid treated and to the type of the process in question. By properly designing the jet injectors, a predictable and highly turbulent flow pattern is generated. This ensures that the whole volume of the vessel contents will uniformly participate in the mixing process, so that no "dead" zones where little or no exchange of phases takes place. To enhance turbulence, desirable for optimizing contact of waste with the bacterial culture, a baffle or deflector vane 66 is disposed adjacent the injector outlet or discharge mouth 65 and substantially parallel to vessel bottom 16. The baffle 66, which is supported on bottom 16 by legs 67, deflects the fluid flow outwardly. The deflected flow from nozzle 54 results in turbulent flow indicated by flow arrows shown in FIGS. 3 and 7. The fluid is shown as being deflected outwardly to the side wall of the chamber, thence upwardly to the upper portion of the chamber, and thence cascading from the side wall to the central portion. The baffle 66 is also adapted to forming a multiplicity of streamlines and thereby increasing the surface area presented to the aerobic bacterial culture.

In operation on a batch basis, the diversion of the treated waste occurs upon the completion of treatment and the system is practically drained, but for a small portion thereof to retain the bacterial culture for the next subsequent batch. The system inlet is then not ulilized in the "make-up" sense, but rather as a batch loading means. On a continuous basis the total system inlet flow of recirculated partially treated waste and of inlet make-up untreated waste is kept substantially consistent so that the rate of production of treated wastes, after treatment initiation, is also substantially constant. The continuous-basis system is adaptable to biochemical oxygen demand (B.O.D.) and chemical oxygen demand (C.O.D.) monitoring feedback instrumentation. Such instrumentation may be, when applied to ordinary sewage wastes, as simple as volumetric metering control of pumpage with constant air injection, or, when applied to hard-to-treat industrial wastes, as sophisticated as feedback control loops to supply more or less oxygen to the system.

The above discussion of the operation of this invention has been drawn in terms of bacterial treatment of sewage and other wastes; however, it is envisioned that the high-turbulence, rapid-mixing action is adaptable to other uses, such as the neutralization of treated water wherein other fluids besides air are injected. While the foregoing description illustrates the preferred embodiment of the present invention, it will be appreciated that certain changes and modifications may be made without departing from the spirit and scope of the invention and that same is defined by the claims as hereinafter set forth.

What is claimed is:

1. In a mixing system for treatment of waste material using aerobic bacterial cultures;

a. a vessel having walls defining a closed mixing chamber therein,
b. waste feed means connected at one end to the source of waste material to be mixed and at the end remote therefrom to said vessel,
c. an elongated discharge means connected in the longitudinal axis of said vessel so as to extend a substantial length into the mixing chamber formed in the vessel, said discharge means having an inlet disposed for communication with the waste feed means, and a plurality of spaced openings along the length of the discharge means to discharge waste materials into said mixing chamber radially outward from the longitudinal axis of the vessel,
d. annular collector means connected in said vessel and disposed in the mixing chamber concentric to the longitudinal axis of the vessel and spaced radially from the elongated discharge means, said annular means having spaced openings forming inlet means for mixed waste materials, and outlet means extending to the exterior of the vessel for passing mixed waste material from the mixing chamber,
e. nozzle means connected in the longitudinal axis of the vessel to communicate with the mixing chamber and for operative association with the elongated discharge means,
f. a baffle means connected in the vessel to permit operative association with the nozzle means so as to direct the returning flow of recirculated waste material towards the walls of said vessel and cause the mixture of waste material in the mixing chamber to move in a circuitous path between the longitudinal axis and the inner wall of the vessel,
g. a recirculating pumping circuit including, a pump having a suction inlet and a discharge outlet, a first conduit connected at one end to said suction inlet and at the opposite end to the outlet of said annular collector means, a second conduit connected at one end to said discharge outlet and at the opposite end to said nozzle means, said recirculating pumping circuit for recirculating mixed waste materials and to cause said mixture of waste materials to move in said circuitous path in the mixing chamber in said vessel,
h. means connected in the recirculating pumping circuit for metering a bacterial-growth supporting fluid therein to be delivered with the recirculated mixed waste material from said mixing system,
i. main discharge outlet means connected to said vessel for passing a portion of the recirculated and mixed waste material from said mixing system.

2. In a mixing system as claimed in claim 1 wherein,
a. the elongated discharge means extends to a point closely adjacent the baffle means in the vessel,
b. the outlet means on said elongated discharge means are peripherally disposed along a substantial portion of the length of said discharge means, and
c. the spaced openings forming the inlet for the annular collector means face the peripherally disposed spaced openings defining the outlet means for the elongated discharge means.

3. In a mixing system for the biochemical treatment of sewage material on a batch production basis;
a. a vessel having walls defining a closed mixing chamber therein,
b. a first pumping circuit connected to said vessel for delivering the sewage material to be treated to the said mixing chamber including,
  1. a first pump having a suction inlet for receiving sewage material, and a discharge outlet for delivering the sewage material,
  2. a sparger connected in the longitudinal axis of said vessel so as to extend a substantial length into the central portion of said mixing chamber, said sparger having an inlet thereon connected to the discharge outlet of said first pump,
  3. nozzle means disposed about the periphery of said sparger forming an outlet means to cause sewage material to flow radially outward from the longitudinal axis of said vessel,
c. an annular collector means connected in said vessel and disposed in the mixing chamber concentric to the longitudinal axis of the vessel and spaced radially about the sparger,
d. said annular collector means having spaced openings forming inlet means thereon for sewage material to be recirculated, and outlet means extending to the exterior of the vessel for passing treated sewage material from the mixing chamber,
e. a second pumping circuit for recirculating treated sewage material back to the mixing chamber including,
  1. a second pump having its suction inlet connected to the outlet means for said annular collector means, and a discharge outlet for said second pump,
  2. a jet nozzle means connected in the longitudinal axis of the vessel to communicate with the mixing chamber and for operative association with the sparger,
  3. conduit means connecting the discharge outlet of said second pump to the jet nozzle means to pass at least a portion of the treated sewage material back to the mixing chamber,
f. baffle means connected in said vessel between the jet nozzle means and the end of the sparger to cause sewage to flow radially outward towards the walls of the vessel and tangential to the radially outward flow from the sparger whereby sewage material moves circuitously between the sparger and the annular collector means,
g. means connected to said second pumping circuit for delivering oxygen to the sewage material recirculated in said second pumping circuit, and
h. main discharge means connected to said vessel for passing a portion of the treated sewage material from the vessel.

4. In a mixing system for the biochemical treatment of sewage material on a batch production basis as claimed in claim 3 including, conventional control instrumentation operatively related to said first pumping circuit and to said main discharge means whereby said first pumping circuit delivers sewage material to be treated to said mixing chamber at approximately the same rate the sewage material is removed from the vessel through the main discharge means for the mixing system.

5. In a mixing system for the biochemical treatment of sewage material on a batch production basis as claimed in claim 3 wherein, the means for delivering oxygen to the second pumping circuit includes,
a. metering means having its inlet disposed to receive ambient air, and having a metering outlet for said ambient air,
b. metering conduit means connected at one end to the metering outlet and at the end remote therefrom to the conduit means in said second pumping circuit, and
c. said metering conduit means connected to the conduit means in said second pumping circuit at a predetermined point adjacent the jet nozzle means.

* * * * *